US011643006B2

(12) United States Patent
Sikkens et al.

(10) Patent No.: US 11,643,006 B2
(45) Date of Patent: *May 9, 2023

(54) LIGHTING ASSEMBLY FOR VEHICLE

(71) Applicant: LUMILEDS LLC, San Jose, CA (US)

(72) Inventors: Marten Sikkens, Nuenen (NL); Marcel De Jong, Eindhoven (NL); Silvia Maria Booij, Eindhoven (NL); Martinus Petrus Creusen, Wijlre (NL)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,460

(22) Filed: Jan. 11, 2022

(65) Prior Publication Data
US 2022/0153184 A1 May 19, 2022

Related U.S. Application Data

(63) Continuation of application No. 16/262,675, filed on Jan. 30, 2019, now Pat. No. 11,260,788.

(30) Foreign Application Priority Data

Mar. 19, 2010 (EP) ..................................... 10156983

(51) Int. Cl.
*B60Q 1/12* (2006.01)
*F21S 41/143* (2018.01)
(Continued)

(52) U.S. Cl.
CPC ............ *B60Q 1/122* (2013.01); *F21S 41/143* (2018.01); *F21S 41/153* (2018.01); *F21S 41/663* (2018.01)

(58) Field of Classification Search
CPC . B60Q 1/12; B60Q 1/122; B60Q 1/16; B60Q 2300/05; F21S 41/143; F21S 41/153; F21S 41/60–663
See application file for complete search history.

(56) References Cited

U.S. PATENT DOCUMENTS 5,609,406 A 3/1997 Cejnek
6,565,247 B2 5/2003 Thominet
(Continued)

FOREIGN PATENT DOCUMENTS

CN 101468621 A 7/2009
DE 19843817 A1 4/2000
(Continued)

OTHER PUBLICATIONS

Article 94(3) EPC dated Dec. 1, 2016, European Application No. 11713082.3, 5 pages.
(Continued)

*Primary Examiner* — Jason M Han

(57) ABSTRACT

A vehicle comprises a first lighting assembly disposed to the left of a longitudinal axis of the vehicle and comprising a first array of independently operable light emitting diodes and a first projection lens arranged to form a front left light beam for the vehicle from light output from the first array of light emitting diodes, a second lighting assembly disposed to the right of the longitudinal axis of the vehicle and comprising a second array of independently operable light emitting diodes and a second projection lens arranged to form a front right light beam for the vehicle from the second array of light emitting diodes, and a controller configured to control activation of the light emitting diodes in the first array of light emitting diodes to adjust an angle between the front left light beam and the longitudinal axis of the vehicle and to control activation of the light emitting diodes in the second array of light emitting diodes to adjust an angle between the front right light beam and the longitudinal axis of the vehicle.

13 Claims, 6 Drawing Sheets

(51) Int. Cl.
*F21S 41/663* (2018.01)
*F21S 41/153* (2018.01)

(56) References Cited

U.S. PATENT DOCUMENTS

| | | | |
|---|---|---|---|
| 6,698,911 B2 | 3/2004 | Naganawa et al. | |
| 7,128,453 B2 | 10/2006 | Tatsukawa et al. | |
| 7,210,828 B2 | 5/2007 | Fukawa et al. | |
| 7,237,928 B2 * | 7/2007 | Takeda | F21S 41/148 362/276 |
| 7,252,417 B2 | 8/2007 | Ravier | |
| 7,427,151 B2 * | 9/2008 | Okubo | F21S 41/657 362/545 |
| 7,540,638 B2 | 6/2009 | Dassanayake et al. | |
| 7,540,658 B2 | 6/2009 | Cheng et al. | |
| 7,699,509 B2 | 4/2010 | Leleve | |
| 7,918,595 B2 | 4/2011 | Albou | |
| 7,959,337 B2 * | 6/2011 | Nakamura | B60Q 1/12 362/543 |
| 8,382,351 B2 | 2/2013 | Ishikawa et al. | |
| 10,227,033 B2 | 3/2019 | Sikkens et al. | |
| 2002/0015630 A1 | 2/2002 | Naganawa et al. | |
| 2004/0114378 A1 | 6/2004 | Nakamura et al. | |
| 2004/0240217 A1 | 12/2004 | Rice | |
| 2004/0263346 A1 | 12/2004 | Neal | |
| 2005/0018436 A1 | 1/2005 | Leleve | |
| 2006/0023461 A1 | 2/2006 | Knight | |
| 2006/0164853 A1 | 7/2006 | Moisel | |
| 2007/0025117 A1 | 2/2007 | Watanabe et al. | |
| 2008/0247182 A1 | 10/2008 | Yasuda et al. | |
| 2008/0247188 A1 | 10/2008 | Woodward | |
| 2008/0263878 A1 | 10/2008 | Merchant et al. | |
| 2010/0021387 A1 | 8/2010 | Heider et al. | |
| 2013/0258688 A1 | 10/2013 | Kalapodas | |
| 2019/0161000 A1 | 5/2019 | Sikkens et al. | |

FOREIGN PATENT DOCUMENTS

| | | |
|---|---|---|
| DE | 202007018181 U1 | 5/2008 |
| DE | 102009021113 A1 | 11/2010 |
| EP | 2101107 A2 | 9/2009 |
| FR | 2760512 A1 | 9/1998 |
| GB | 2443737 B | 8/2011 |
| JP | 2005317226 A | 10/2005 |
| JP | 2006001393 A | 1/2006 |
| JP | 2008074327 A | 4/2008 |
| RU | 2115060 C1 | 7/1998 |
| WO | 2008138106 A1 | 11/2008 |

OTHER PUBLICATIONS

Article 94(3) EPC dated Dec. 20, 2017, European Application No. 11713082.3, 4 pages.
EP Office Action pursuant to Article 94(3) EPC, dated Jul. 6, 2018, EP Patent Application No. 11713082.3, 6 pages.
EPO as the ISA, PCTIB2011/051029 filed Mar. 11, 2011, "International Search report and Written Opinion" dated Jun. 7, 2011, 12 pages.
First Office Action, China Application No. 201180014763.6, dated Jul. 30, 2014, 31 pages.
Japan Office Action dated Oct. 7, 2014, Japan Application No. 2012-557642, 4 pages.
Japan Office Action dated Mar. 15, 2015, Japan Application No. 2012-557642, 3 pages.
Official Action, Russian Application No. 2012144445, dated Mar. 23, 2015, 8 pages.

* cited by examiner

LIGHTING ASSEMBLY FOR VEHICLE

CROSS-REFERENCE TO RELATED APPLICATIONS

This application is a continuation of U.S. patent application Ser. No. 16/262,675 filed Jan. 30, 2019, which is a divisional of U.S. application Ser. No. 13/635,483 filed Sep. 17, 2012, which is a 371 Application of International Application No. PCT/IB2011/051029, filed Mar. 11, 2011, which claims priority to European Application No. 10156983.8, filed Mar. 19, 2010. Each of the applications identified in this paragraph is incorporated herein by reference in its entirety.

FIELD OF THE INVENTION

The invention describes a lighting assembly, a controller for such a lighting assembly, an automotive headlamp comprising such a lighting assembly, and a method of generating a front beam for a vehicle comprising such a lighting assembly.

BACKGROUND OF THE INVENTION

Adaptive Front Lighting is being offered by several automotive manufacturers. In AFL, the vehicle's left and right headlamps are controlled together to adapt or adjust the front beams to the momentary driving situation. For example, when turning to the left or right, a controller determines the angle of turning and causes a part of the headlamp—usually the projection lens—to swivel by a corresponding swivel angle, so that the beam also swivels. In this way, the low beam does not remain stationary relative to the vehicle as is the case for conventional headlamps, but it is directed deliberately 'into' the turn.

While such swiveling headlamps offer the advantage of being able to actively control the headlamp beam direction when turning into a corner so as to optimally illuminate the actual direction of travel, they also have a number of disadvantages. Firstly, if the vehicle is being turned into a 'sharp' corner, e.g. when turning off the road at a right angle into a side-road or when performing a U-turn, the outer beam 'turns in' towards the body of the vehicle and this effectively blocks a part of that beam. For example, when turning to the extreme left, the right beam is in many cases at least partially obstructed by the car body. This effect is largely unavoidable in conventional arrangements since, for various reasons, the body of the headlamp cannot extend beyond the body of the vehicle, and the projection lens is positioned inside the headlamp (behind the front glass cover). Secondly, any moving parts such as motors or actuators required to physically swivel the moveable parts of the headlamp arrangements are vulnerable to damage or failure.

The first AFL arrangements used xenon or halogen lamps with a projection lens or reflector to image the single light source. However, developments in the field of light-emitting diode technology have led to very bright high-power LEDs that are suitable for use in automotive lighting applications. In place of a single xenon or halogen lamp, an array or matrix of LEDs can be used to generate a front beam. The 'swivel' effect can be obtained by using a suitable projection lens and activating only those LEDs that are required to generate the beam at any given time. For example, to swivel or direct the beam to the right, those LEDs on the left-hand side of the optical axis are turned on while the others are turned off. However, a well-defined beam can only be obtained using the LEDs close to the optical axis. The light originating from the light sources further away from the optical axis, namely those light sources used to generate the extreme swiveled beam, is subject to aberration, and the resulting beam is poorly defined. To obtain a well-defined beam in keeping with ECE and SAE regulations, therefore, the projection lens must be designed to compensate for this aberration, but such lens design generally presents a high cost factor.

Therefore, it is an object of the invention to provide an improved and economical and robust dynamic headlamp arrangement which avoids the problems described above.

SUMMARY OF THE INVENTION

The object of the invention is achieved by the lighting assembly according to claim 1, a controller according to claim 9, a lighting arrangement according to claim 12, and a method according to claim 14 of generating a front beam.

According to the invention, the lighting assembly for use in a lighting arrangement of a vehicle comprises a projection lens and an array of light sources, wherein the projection lens and the light source array are arranged according to an asymmetry displacement of the optical axis of the projection lens, and wherein the light sources of the light source array of the lighting assembly are individually controllable to adjust a swivel angle of a light beam generated by that lighting assembly.

The core idea of the invention is to introduce the asymmetry displacement of the optical axis of the of the projection lens so that the entire beam can be used for all degrees of beam swivel. In contrast to prior art lighting assemblies, in which a proportion of the light of a swiveled beam can be blocked by the body of the vehicle, the lighting assembly according to the invention ensures that no light is generated needlessly. Therefore, an advantageously high-quality beam can be obtained for all front beam requirements. Another obvious advantage of the lighting assembly according to the invention is that, since a certain degree of beam swivel is already given by the asymmetry displacement of the optical axis of the projection lens of the lighting assembly, less light sources are required in the lighting assembly according to the invention. Also, the lighting assembly according to the invention requires no moving parts since no component of the lighting assembly need be moved.

The controller for controlling the light sources of such a lighting assembly to adjust a swivel angle of a light beam generated by that lighting assembly comprises a control signal generation unit for generating a control signal for selectively activating specific light sources of the lighting assembly on the basis of the asymmetry displacement of the optical axis of the of the projection lens.

The lighting arrangement according to the invention comprises such a lighting assembly for generating a light beam, and such a controller for controlling the light sources of the lighting assembly to adjust the swivel angle of the light beam.

The method according to the invention of generating a front beam for a vehicle comprising a lighting assembly for generating the beam, wherein a projection lens and a light source array of the lighting assembly are arranged according to an asymmetry displacement of the optical axis of the of the projection lens of the lighting assembly, comprises the steps of sensing an angle of turning of the vehicle and generating a control signal for the lighting assembly on the basis of the asymmetry displacement and the angle of turning to selectively activate specific light sources of the lighting assembly to adjust the swivel angle of the beam.

The dependent claims and the following description disclose particularly advantageous embodiments and features of the invention. Features of the embodiments may be combined as appropriate.

In the following, the standard convention is used in which it is assumed that the vehicle is regarded from above. A longitudinal axis of the vehicle is to be understood to be an axis coinciding with the direction of travel of the vehicle (and should not be mistaken for an axis of symmetry of the vehicle). Also, the term 'projection lens' can cover a lens system comprising a plurality of lenses, in which case the optical axis is to be understood to be the optical axis of the lens system.

The lighting assemblies known from the prior art are arranged with the optical axis essentially aligned with the direction of travel, i.e. parallel to the longitudinal axis of the vehicle, and a fairly 'wide' array of light sources is required to obtain an extreme angle of beam swivel, in the following referred to as 'extreme swivel angle' or 'maximum beam swivel'. As already indicated above, when a front beam of a prior art lighting assembly is directed sideways or laterally relative to the direction of travel of the vehicle, and the degree of beam deflection is high, the light originating from one or more of the light sources at the outer edge of the light source array may be wasted, since this light can be blocked by the body of the vehicle. Therefore, in a particularly preferred embodiment of the invention, the asymmetry displacement comprises a lateral offset between a center of the light source array and the optical axis of the of the projection lens of the lighting assembly. For example, in a lighting assembly for generating a front left beam (i.e. the 'left half' of a front beam), the light source array can be offset to the right of the optical axis. The asymmetry arises by simply leaving out those light sources that do not contribute to an extreme swiveled beam. Therefore, the lighting assembly can be realized more cost-effectively then a comparable prior-art lighting assembly.

In the above embodiment, the optical axis of the lighting assembly is essentially congruent with the direction of travel of the vehicle. In another, particularly preferred embodiment of the invention, the asymmetry displacement comprises a non-zero fixed angle between the longitudinal axis of direction of travel of the vehicle and the optical axis of the of the projection lens of the lighting assembly. Here, the lighting assembly is arranged to 'point away from' the longitudinal axis of the vehicle. This implies that the light source array is also arranged at an angle to, i.e. tilted away from, the longitudinal axis of the vehicle. Therefore, assuming the direction of travel and therefore also the longitudinal axis of the vehicle corresponds to zero degrees, and using the standard convention (in which it is assumed that the vehicle is regarded from above), the optical axis of a left-hand light assembly is arranged at a positive angle to the longitudinal axis to point somewhat to the left, while the optical axis of a right-hand lighting assembly is arranged at a negative angle to the longitudinal axis so that the lighting assembly points somewhat to the right of the vehicle. The idea behind the invention is that the beam on the 'inside' of a turn should make a significant contribution to the swiveled beam, while the contribution of the other beam is not so relevant. The approach taken by the invention is to strongly swivel the 'inside' beam, and to swivel the 'outside' beam to a lesser extent. From the point of view of the 'inside' beam, a certain amount of beam swivel is already given by the angle between the optical axis of the lighting assembly and the longitudinal axis of the vehicle. From the point of view of the 'outside' beam, since it will not be swiveled as strongly into the turn, none of the beam will be blocked by the vehicle itself.

By arranging the lighting assembly at an angle to the longitudinal axis of the vehicle, a high-quality beam can be obtained since a satisfactory degree of beam swivel can be obtained using light sources closer to the optical axis. The projection lens can therefore be relatively simple since it is not necessary to perform any corrections for aberration. Furthermore, since the lighting assembly is already tilted to some extent relative the direction of travel, a light source closer to the optical axis can contribute to a swiveled beam. Therefore, in a further preferred embodiment of the invention, the light sources of the light source array are distributed essentially symmetrically about the optical axis of the lighting assembly.

To ensure that as much light as possible is collected by the projection lens of the lighting assembly, in a preferred embodiment of the invention the light source array is arranged essentially perpendicularly to the optical axis of the lighting arrangement.

Again, by having the physical placement of the lighting assembly make a contribution to the beam direction, a light source closer to the optical axis of the lighting assembly (compared to prior art solutions) can be used to generate an extreme swivel angle. Therefore, in a lighting assembly according to the invention, the light source array comprises a linear array of at most ten light sources, more preferably at most eight light sources.

For added visibility and safety when directing a vehicle into a turn, the area on the 'inside' of the turn is preferably illuminated to a greater extent. Therefore, the lighting assembly is preferably realized to achieve a maximum beam swivel angle of at least 11°, more preferably at least 13°, most preferably at least 15° relative to the longitudinal axis of the vehicle. The degree of beam swivel that can be obtained by the lighting assembly according to the invention is governed by several parameters, for example the size of the fixed angle between the optical axis of the lighting assembly and the longitudinal axis of the vehicle and/or the extent of the lateral offset between the light source array center and the optical axis, as well as on the size of the light source array. For a lighting arrangement using two lighting assemblies according to the invention, one for the left beam and one for the right beam, the beam swivel relative to the optical axis of the lighting assembly will be larger for the 'outside' beam.

As mentioned in the introduction, front headlight assemblies can be realized using suitable light sources such as xenon lamps, halogen lamps, etc. Basically, any suitable light source can be used in a light source array of a lighting assembly according to the invention. However, since each xenon or halogen lamp has a relatively bulky glass envelope and large physical base, such lamps cannot be placed close together to give a tight array or matrix of light sources. Therefore, in a particularly preferred embodiment of the invention, a light source of the light source array comprises an LED, since LED light sources are very compact and a series of LEDs can be arranged very close together in an array or matrix. Preferably, naked-die LEDs are used. The overall image of the 'light source' (in this case, the actively lit neighboring LEDs of the array) appears to originate from a single light source. Use of LEDs as light sources has the further advantage that these can be switched very rapidly unlike a xenon lamp, for example, which requires a certain warm-up time when switched on. Also, the quality of the light output by an LED remains essentially constant over its lifetime. In the following, therefore, the light sources of the light source arrays can be assumed to be LEDs, but without restricting the invention in any way.

As mentioned above, the asymmetry displacement of a lighting assembly already contributes to the beam swivel angle. The turning angle of the vehicle will also determine the extent of beam swivel required to optimally illuminate the area in front of the vehicle when turning into a corner. Therefore, in a further preferred embodiment of the invention, the controller unit also comprises a sensing means for sensing an angle of turning of the vehicle, and the control signal generation unit is realized to generate the control signal for the light sources of the lighting assembly on the basis of the angle of turning. Evidently, the controller unit could also comprise a sensor for sensing an angle of incline, and the control signal for the light sources of the lighting assembly can selectively activate light sources to compensate for the angle of incline.

Since only some of the LEDs of an array need by switched at any one time, the control signal generated by the control signal generation unit preferably comprises a plurality of actuation signals, wherein each actuation signal is associated with a specific light source of the light source array. For a lighting arrangement comprising a left lighting assembly and a right lighting assembly, separate control signals are preferably generated for the left and right lighting assemblies.

The lighting assembly according to the invention can be used in vehicles with only a single headlamp, for example a motorcycle. The asymmetry displacement can be chosen so that the front beam is angled slightly away from the direction of travel. For example, the fixed angle between the optical axis of the lighting assembly and the longitudinal axis of the front wheel can be chosen such that the lighting assembly points slightly into the verge in order to improve visibility for the motorcyclist and to reduce glare for other traffic participants.

A front beam generated by a vehicle such as an automobile comprises a left beam and a right beam. Therefore, the lighting arrangement according to the invention preferably comprises a first lighting assembly for generating a first beam of light and a second lighting assembly for generating a second beam of light, wherein the projection lens and the light source array of the first lighting assembly are arranged according to a first asymmetry displacement of the optical axis of the first projection lens, the projection lens and the light source array of the second lighting assembly are arranged according to a second asymmetry displacement of the optical axis of the second of the projection lens, and wherein the controller is realized to generate a first control signal for controlling the light sources of the first lighting assembly to adjust the swivel angle of the first light beam and a second control signal for controlling the light sources of the second lighting assembly to adjust the swivel angle of the second light beam. Since each lighting assembly is arranged according to an asymmetry displacement, the LEDs that are activated in the left-hand lighting assembly may be different from the LEDs that are activated in the right-hand assembly at any one time. For example, for generating a front beam, one or more LEDs to the left of the optical axis can be activated in the left-hand lighting assembly (for example to compensate for the slight leftward tilt of the lighting assembly relative to the direction of travel and/or a lateral offset between the light source array and the optical axis), while a corresponding one or more LEDs to the right of the optical axis can be activated in the right-hand lighting assembly (for example to compensate for the slight rightward tilt of the lighting assembly relative to the direction of travel and/or a lateral offset between the light source array and the optical axis). The asymmetry displacements can be the same for the left and right lighting assembly, e.g. each lighting assembly is directed away from the longitudinal axis by the same angle, albeit in different directions, or each light source array if offset from the relevant optical axis by an equal and opposite distance. Equally, depending on requirements, the asymmetry displacements can be different, for example so that one lighting assembly is directed away from the longitudinal axis to a lesser or greater extent than the other lighting assembly.

By taking the various relevant parameters such as fixed angle, lateral offset, turning angle etc into account, a beam generated by the lighting arrangement according to the invention can be controlled by generating a first control signal for the first lighting assembly to selectively activate specific light sources of the first lighting assembly to adjust the swivel angle of the left beam, and a second control signal for the second lighting assembly to selectively activate specific light sources of the second lighting assembly to adjust the swivel angle of the right beam. In this way, a front beam for optimally illuminating a critical region is obtained, while allowing a simple and economical lighting assembly design.

BRIEF DESCRIPTION OF THE DRAWINGS

In the drawings, like numbers refer to like objects throughout. Objects in the diagrams are not necessarily drawn to scale. In particular, the refraction of light beams through projection lenses is only schematically indicated in the diagrams.

DETAILED DESCRIPTION OF THE EMBODIMENTS

Figure 1:
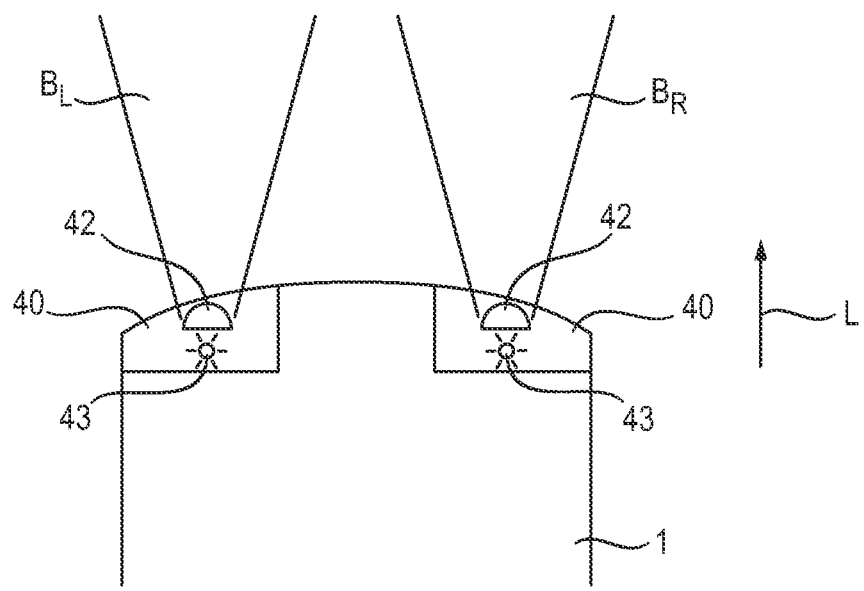
FIG. 1 shows a simplified plan view of a vehicle with a prior art lighting arrangement.
Figure 1:
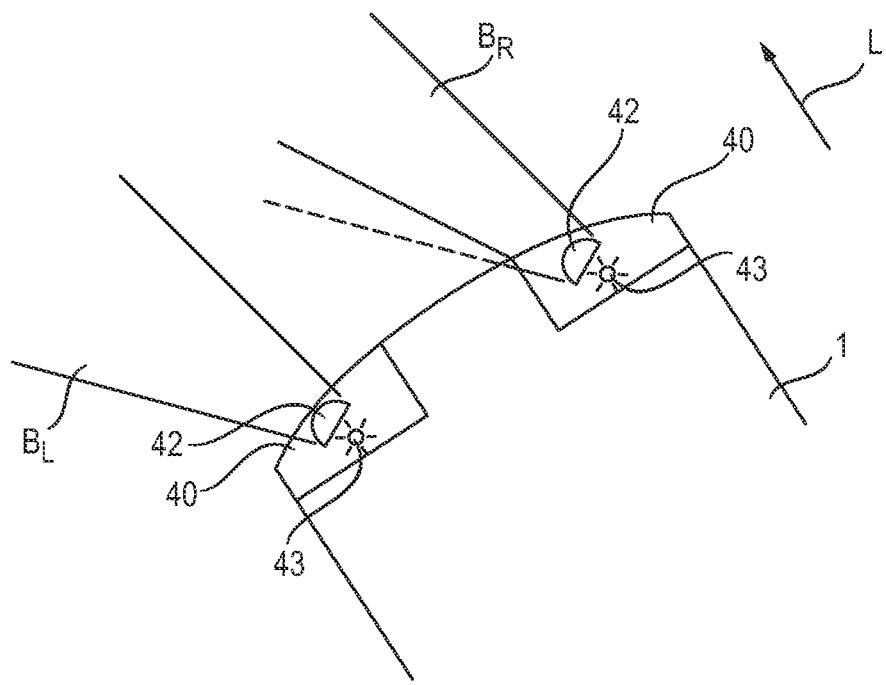

FIG. 1 shows a simplified plan view of a vehicle 1 with a prior art lighting arrangement comprising left and right headlamps 40, each with an AFL front lighting assembly 40, for generating a front beam $B_L$, $B_R$, which front beam $B_L$, $B_R$ comprises a left beam $B_L$ and a right beam $B_R$. Each AFL front lighting assembly 40 comprises a projection lens 42 in front of a point light source 43, such as a xenon or halogen lamp 43. In the top of the diagram, the vehicle 1 is shown driving straight ahead, so that the front beam $B_L$, $B_R$ is directed essentially parallel to a longitudinal axis L of the vehicle 1. The complete headlamp 40, comprising the projection lens 42 and the light source 43, can be mechanically swiveled to control the direction of projection of the front beam $B_L$, $B_R$. In the bottom part of the diagram, the vehicle 1 is turning to the left, and the front beam $B_L$, $B_R$ is also directed or swiveled to the left. As the diagram shows, the lighting assemblies 40 are swiveled in order to direct the beams $B_L$, $B_R$ in the desired direction. The amount of beam swivel is largely determined by the turning angle of the vehicle. However, for extreme turning angles, the outside beam (in this example the right-hand beam $B_R$) is to some extent cut off, as indicated by the broken line, since the body of the vehicle 1 presents an obstruction to the beam as the projection lens 42 is directed 'into' the body of the vehicle.

Figure 2:
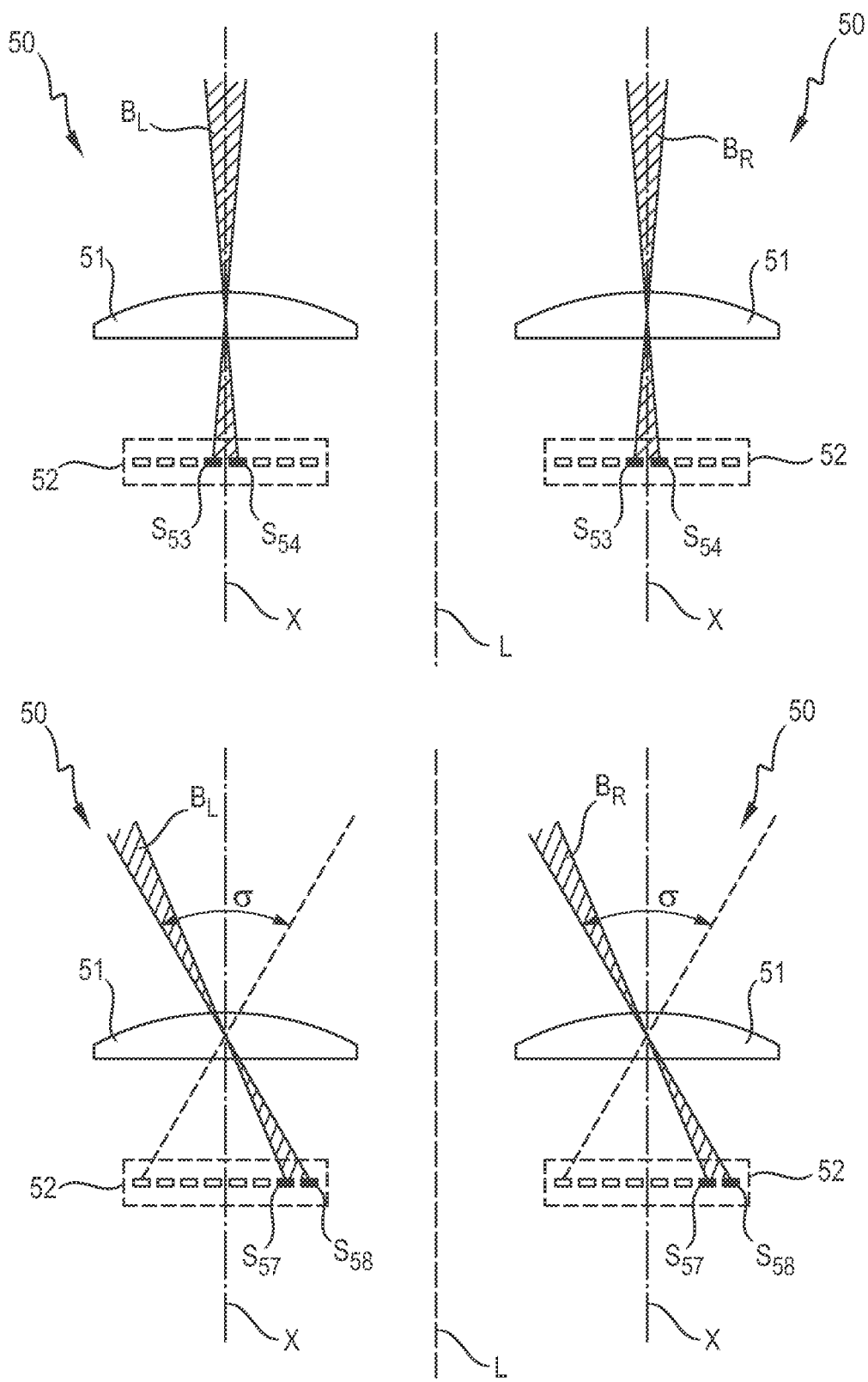
FIG. 2 shows a prior art lighting arrangement of a vehicle.

FIG. 2 shows a prior art lighting arrangement of a vehicle for generating a front beam $B_L$, $B_R$, comprising two lighting assemblies 50 on either side of a longitudinal axis L of the vehicle, and the lighting assemblies 50 are arranged so that the optical axis X in each case is arranged parallel to the longitudinal axis L of the vehicle. For the sake of clarity, the vehicle in which the lighting arrangement is incorporated is not shown. The lighting assembly 50 on the left-hand side of the longitudinal axis L is used to generate the left beam $B_L$, and the lighting assembly 50 on the right-hand side of the longitudinal axis L is used to generate the right beam $B_R$. This type of lighting arrangement does not require that the lighting assemblies 50 be movable. The light sources $S_{51}, \ldots, S_{58}$ of each lighting assembly 50 can be arranged in an array 52 or matrix essentially centered about an optical axis 54 of the projection lens 51. To generate a beam that is directed essentially outwards in the direction of travel, as shown in the upper part of the diagram, only those light sources $S_{53}$, $S_{54}$ close to the optical axis X need to be activated, while the remainder can be turned off. To cause the beam to swivel, as shown in the lower part of the diagram, other light sources $S_{57}$, $S_{58}$ further away from the optical axis X are activated, while the remainder are switched off. The symmetrical arrangement of the light sources about the optical axis X of the lighting assembly 50 means that the same light sources on each side can be activated to obtain the desired beam swivel. The maximum beam swivel angle σ is indicated in the lower half of the diagram. However, for extreme angles, this type of lighting arrangement has the same disadvantage mentioned in FIG. 1 above, namely that for the outside beam, the body of the vehicle represents an obstruction so that some of the light is effectively blocked. Furthermore, this solution also suffers from poor beam definition since the light sources that are furthest away from the optical axis X—in this case light sources $S_{51}$, $S_{58}$ generate light which is subject to significant aberration as it passes through the projection lens 51. Therefore, when turning into a corner, the highly swiveled beam maybe may not be sharp enough to comply with the front beam regulation. A more complex projection lens is required to compensate for the poor beam quality, thus adding to the overall expense.

Figure 3:
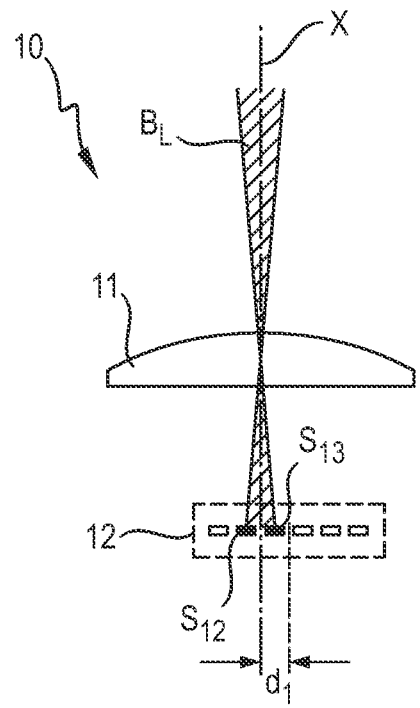
FIG. 3 shows a lighting arrangement according to a first embodiment of the invention.
Figure 3:
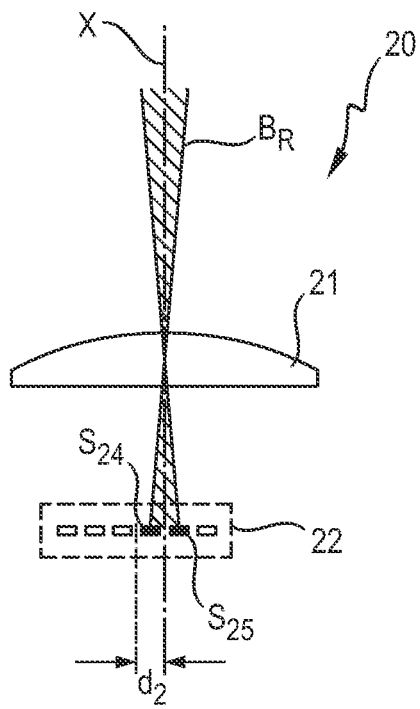
Figure 3:
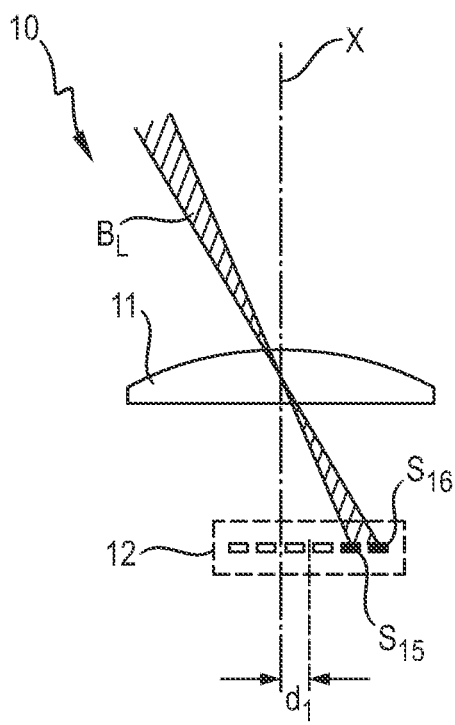
Figure 3:
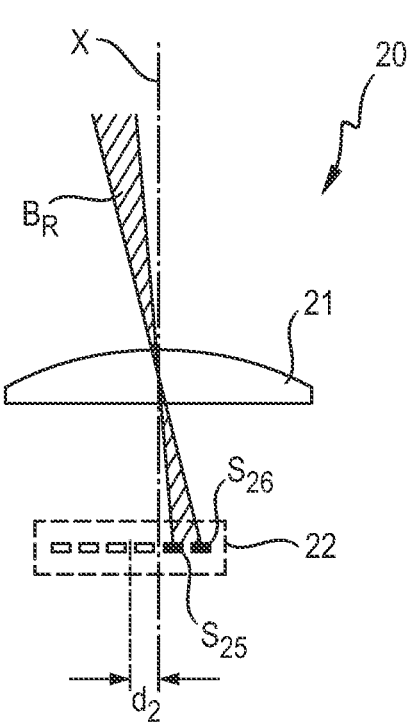

FIG. 3 shows a left lighting assembly 10 and a right lighting assembly 20 of a lighting arrangement according to a first embodiment of the invention. Here, a light source array 12 of the first lighting assembly 10 is arranged with a lateral offset $d_1$ from the optical axis $X_1$ of the first lighting assembly 10. Therefore, the light sources $S_{11}, \ldots, S_{16}$ of the light source array 12 are arranged asymmetrically about the optical axis $X_1$ of the first lighting assembly 10. Similarly, a light source array 22 of the second lighting assembly 20 is arranged with a lateral offset $d_2$ from the optical axis $X_2$ of the second lighting assembly 10, so that the light sources $S_{21}, \ldots, S_{26}$ of the light source array 22 are arranged asymmetrically about the optical axis $X_2$ of the second lighting assembly 20. In each case, the optical axis $X_1$, $X_2$ is arranged parallel to the longitudinal axis L of the vehicle. In this realization, each lighting assembly 10, 20 can generate a beam with a high degree of swivel, while only including those light sources that are actually required for a beam a. Light sources that would not contribute to a highly swiveled beam are simply left out, so that this design requires less light sources that the prior art solution described in FIG. 2.

Figure 4:
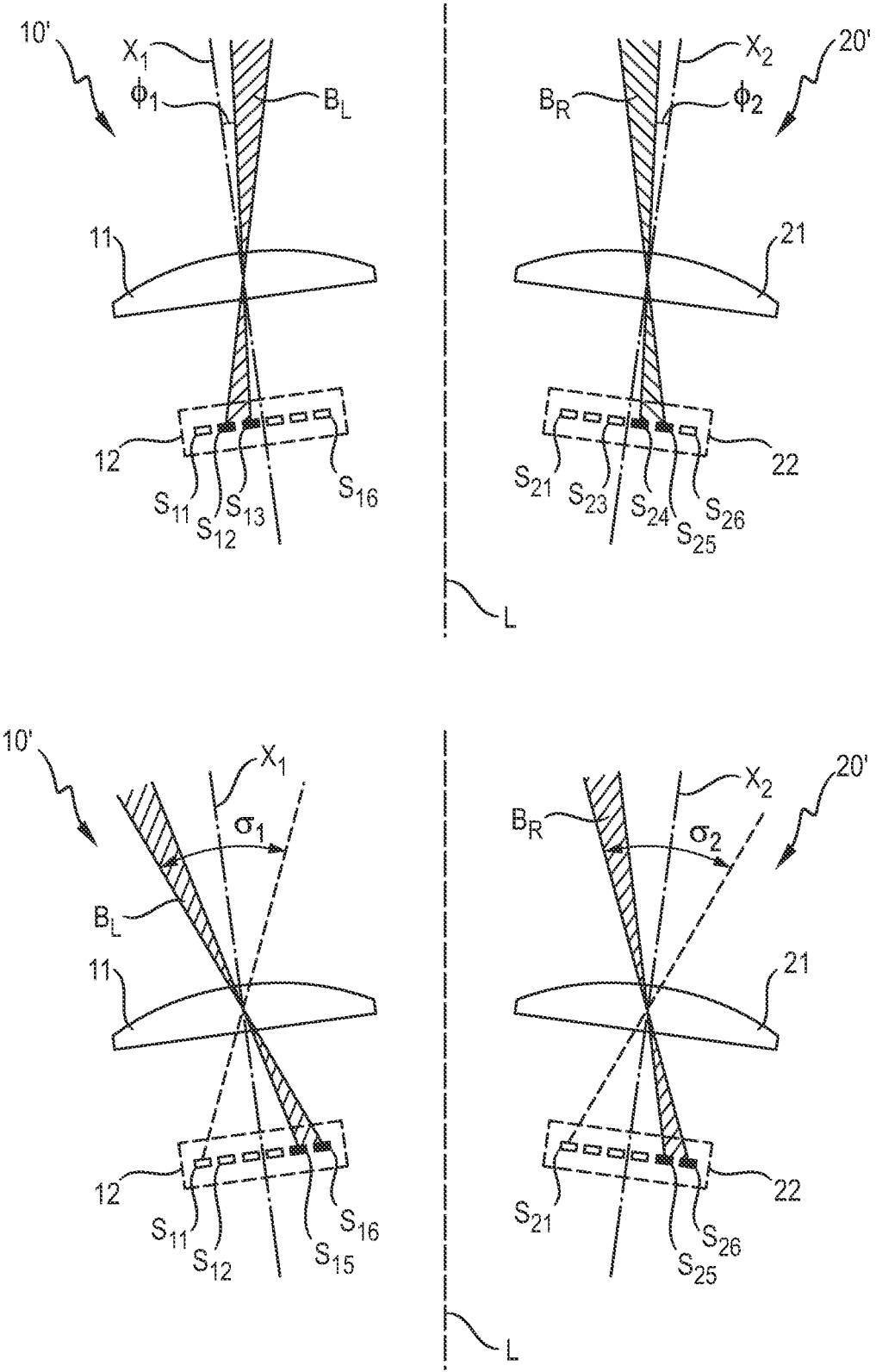
FIG. 4 shows a lighting arrangement according to a second embodiment of the invention.

FIG. 4 shows a left lighting assembly 10' and a right lighting assembly 20' of a lighting arrangement according to a first embodiment of the invention. The first lighting assembly 10 is used for generating a left beam $B_L$ and the second lighting assembly 20' is used for generating a right beam $B_R$. Each lighting assembly 10', 20' comprises an array 12, 22 of light sources $S_{11}, \ldots, S_{16}, S_{21}, \ldots, S_{26}$ arranged symmetrically about an optical axis $X_1$, $X_2$ of the lighting assembly 10', 20'. The optical axis $X_1$, $X_2$ of each lighting assembly 10', 20', in turn, is arranged at an angle $\Phi_1$, $\Phi_2$ to the longitudinal axis L of the vehicle 1. The left lighting assembly 10' has an optical axis $X_1$ arranged at a first angle $\Phi_1$ to the longitudinal axis L of the vehicle 1, and the optical axis $X_2$ of the second lighting assembly 20' is arranged at a second angle $\Phi_2$ to the longitudinal axis L of the vehicle 1. In other words, the left-hand lighting assembly 10' points somewhat to the left of the direction of travel of the vehicle, while the right-hand lighting assembly 20' points somewhat to the right of the direction of travel of the vehicle. The top part of the diagram shows a front beam being generated. To this end, one or both of the light sources close to the optical axis $X_1$, $X_2$ are active, while the remaining light sources are turned off. Since the lighting assemblies 10', 20' are tilted with respect to the longitudinal axis of the vehicle, the left beam $B_L$ can be generated by activating one two of the light sources $S_{12}$, $S_{13}$ just to the left of the optical axis $X_1$ of the left-hand lighting assembly 10', while the right beam $B_R$ can be generated by activating one two of the light sources $S_{24}$, $S_{25}$ just to the right of the optical axis $X_2$ of the right-hand lighting assembly 20'.

When turning the vehicle into a corner, the front beam $B_L$, $B_R$ is swiveled, whereby the degree of beam swivel is controlled by the choice of light sources that are activated. This can be done as shown in the bottom half of the diagram, where an extreme left-swiveled front beam is shown. To generate a swiveled beam into a left turn, groups of light sources of the left-hand lighting assembly 10' and groups of light sources of the right-hand lighting assembly 20' are successively turned on while the remaining light sources are turned off. An exemplary sequence of activated light source groups may be $S_{12}$, $S_{13}$; $S_{13}$, $S_{14}$; $S_{14}$, $S_{15}$; $S_{15}$, $S_{16}$ for the left-hand lighting assembly 10 and $S_{23}$, $S_{22}$; $S_{22}$, $S_{21}$ for the right-hand lighting assembly 20. When taking a turn to the right, the sequences would run in the opposite direction, in this case light sources $S_{12}$, $S_{13}$; $S_{12}$, $S_{11}$ for the left-hand lighting assembly 10 and light sources $S_{22}$, $S_{23}$; $S_{23}$, $S_{24}$; $S_{24}$, $S_{25}$; $S_{25}$, $S_{26}$ for the right-hand lighting assembly 20 would be activated while the other light sources are turned off. The degree of beam swivel $\sigma_1$, $\sigma_2$ obtainable by the lighting assembly 10', 20' according to the invention is less that that shown by the prior art solutions described above. However, by arranging each lighting assembly 10', 20' so that its optical axis is at an angle to the longitudinal axis L of the vehicle 1, the front beam can still be satisfactorily directed into the turn, while requiring less light sources that the prior art solution. Furthermore, the beam quality of the swiveled front beam obtained in this manner is satisfactorily high without requiring any complex lens design.

Figure 5:
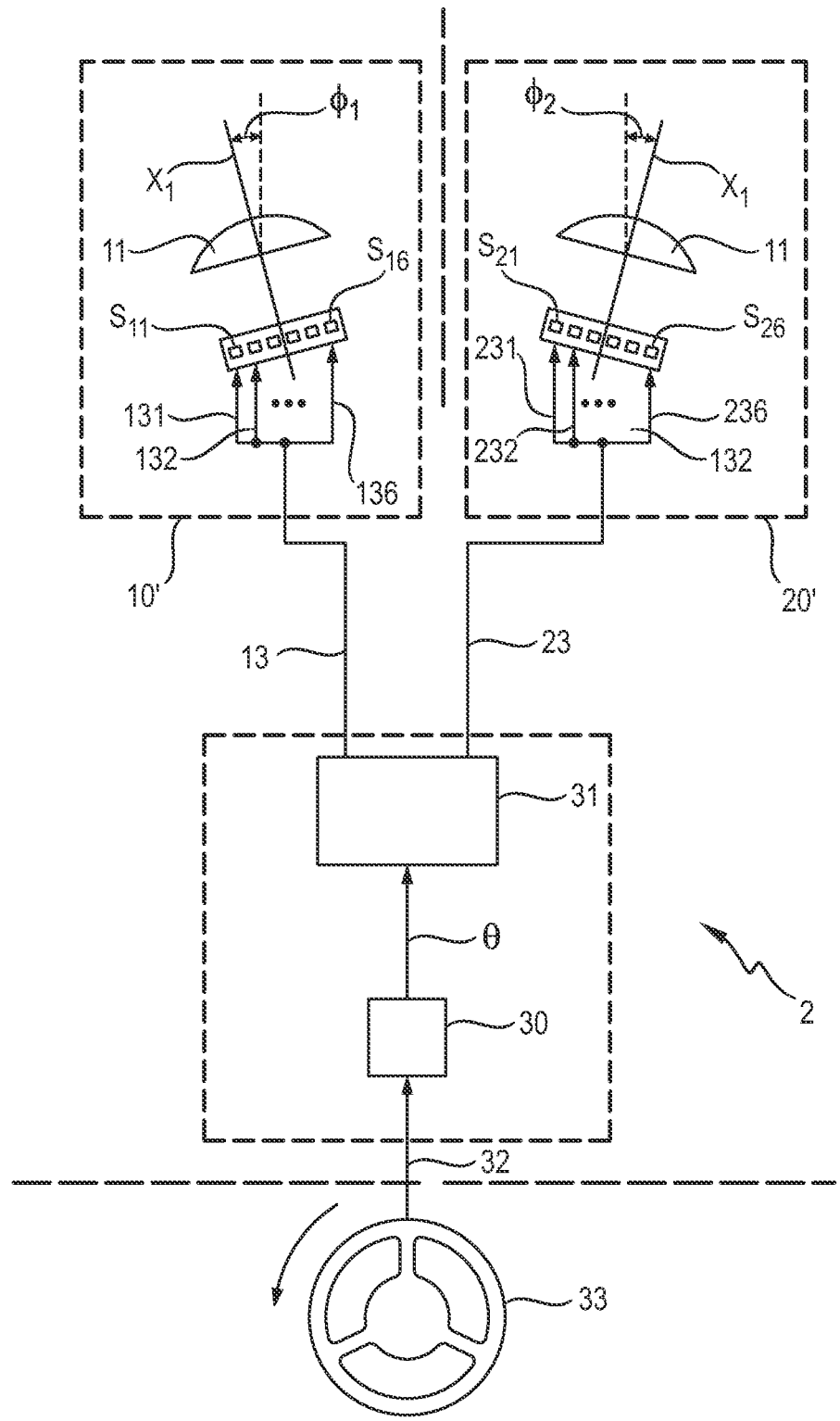
FIG. 5 shows a lighting arrangement according to a further embodiment of the invention.

FIG. 5 shows a lighting arrangement 2 according to the invention, with a controller 3 for controlling the light sources $S_{11}, \ldots, S_{16}, S_{21}, S_{26}$ of the lighting arrangement 2. As already described in FIG. 4 above, the lighting arrangement 2 comprises left-hand lighting assembly 10' and a right-hand lighting assembly 20', in each case with an optical axis $X_1$, $X_2$ arranged at an angle $\Phi_1$, $\Phi_2$ to the longitudinal axis L of the vehicle. The degree of beam swivel is controlled according to the direction of travel of the vehicle. This can be determined by an appropriate sensor or signal, for example a signal obtained from the steering column of the vehicle. In this example, a signal 51 from the steering column is analyzed by an analysis unit 30 to determine an angle of turning θ. This is used by a control signal generation unit 31 which generates a control signal 13 for the left hand lighting assembly 10' and a control signal 23 for the right-hand lighting assembly 20'. Each control signal 13, 23 comprises a number of signals 131, . . . 136, 231, . . . , 236 for individually controlling the light sources $S_{11}$, . . . , $S_{16}$, $S_{21}$, . . . , $S_{26}$ of each lighting assembly 10', 20'. The choice of light source to be turned on or off for each light source array can also depend on the fixed angle $\Phi_1$, $\Phi_2$ of the optical axis $X_1$, $X_2$ of the lighting assembly 10', 20' to the longitudinal axis L of the vehicle. This information may, for example, be stored in the signal generation unit 31. The speed with which the front beam $B_L$, $B_R$ is swiveled (i.e. the speed with which successive groups of light sources of a light source array are activated) may be directly related to the rate at which the vehicle is being directed into the turn. This can be determined by the analysis unit 30, for example, which may be equipped to analyze the signal 51 to determine a rate of turning of the vehicle. Using the information provided to the control unit 3, light sources $S_{11}$, . . . , $S_{16}$, $S_{21}$, . . . , $S_{26}$ of each lighting assembly 10', 20' can be individually turned on or turned off to control the degree of beam swivel of the front beam $B_L$, $B_R$.

Figure 6:
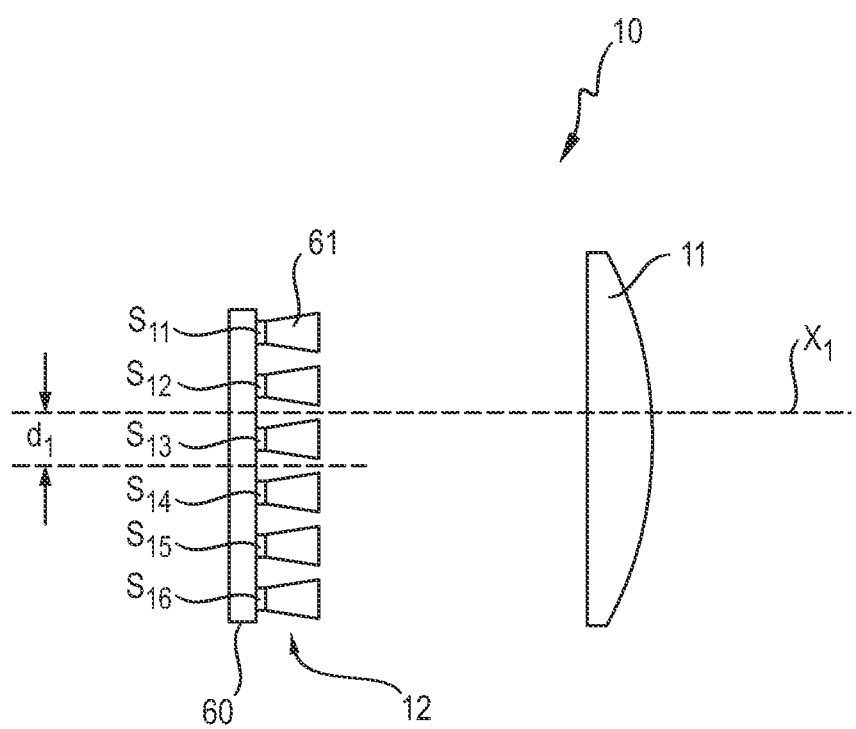
FIG. 6 shows a schematic view of a lighting assembly according to an embodiment of the invention.

FIG. 6 shows a schematic view of a lighting assembly 10 according to an embodiment of the invention. Here, an array 12 of six naked-die LEDs $S_{11}$, . . . , $S_{16}$ on a substrate 60 is arranged asymmetrically, with a lateral offset $d_1$, about the optical axis $X_1$ of an aspheric projection lens 11. The light emitted by each LED $S_{11}$, . . . , $S_{16}$ is optimally directed at the projection lens 11 by a collimator 61. Each collimator 61 can have an essentially square or rectangular light exit opening, so that the collimators 61 can be placed in close proximity to each other in a one-dimensional or two-dimensional array 12. The light emitted by neighboring light sources will then appear to originate from a single light source when imaged by the projection lens 11.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. A "unit" or "module" can comprise a number of units or modules.

The invention claimed is:

1. A vehicle comprising a lighting arrangement, the lighting arrangement comprising:
   a first lighting assembly disposed to the left of a longitudinal axis of the vehicle and comprising a first array of independently operable light emitting diodes and a first projection lens arranged to form a front left light beam for the vehicle from light output from the first array of light emitting diodes;
   a second lighting assembly disposed to the right of the longitudinal axis of the vehicle and comprising a second array of independently operable light emitting diodes and a second projection lens arranged to form a front right light beam for the vehicle from the second array of light emitting diodes;
   the first and second lighting assemblies arranged with a center of the first array of light emitting diodes offset laterally with respect to the optical axis of the first projection lens to the right toward the longitudinal axis of the vehicle and with a center of the second array of light emitting diodes offset laterally with respect to the optical axis of the second projection lens to the left toward the longitudinal axis of the vehicle;
   and a controller configured to control activation of the light emitting diodes in the first array of light emitting diodes to adjust an angle between the front left light beam and the longitudinal axis of the vehicle and to control activation of the light emitting diodes in the second array of light emitting diodes to adjust an angle between the front right light beam and the longitudinal axis of the vehicle.

2. The vehicle according to claim 1, wherein the first array of light emitting diodes is arranged substantially perpendicularly to the optical axis of the first projection lens and the second array of light emitting diodes is arranged substantially perpendicularly to the optical axis of the second projection lens.

3. The vehicle according to claim 1, wherein the first array of light emitting diodes and the second array of light emitting diodes are each linear arrays of light emitting diodes.

4. The vehicle according to claim 3, wherein the first array of light emitting diodes and the second array of light emitting diodes each comprise no more than ten light emitting diodes.

5. The vehicle according to claim 1, wherein the first projection lens and the second projection lens each have a parabolic horizontal cross-section.

6. The vehicle according to claim 1, wherein:
   the first projection lens is distinct from an outer transparent cover that covers the first lighting assembly and is disposed between the first lighting assembly and the outside of the vehicle; and
   the second projection lens is distinct from the same or another transparent cover that covers the second lighting assembly and is disposed between the second lighting assembly and the outside of the vehicle.

7. The vehicle according to claim 1 comprising a sensor configured to determine a direction of turning of the vehicle, wherein:
   the controller is configured to control activation of the light emitting diodes in the first array of light emitting diodes and to control activation of the light emitting diodes in the second array of light emitting diodes based on the direction of turning to adjust output directions of the front left light beam and the front right light beam toward the direction of turning;
   the first array of light emitting diodes is arranged perpendicularly to the optical axis of the first projection lens and the second array of light emitting diodes is arranged perpendicularly to the optical axis of the second projection lens;
   the first array of light emitting diodes and the second array of light emitting diodes are each linear arrays of light emitting diodes;
   the first projection lens and the second projection lens each have a parabolic horizontal cross-section;

the first projection lens is distinct from an outer transparent cover that covers the first lighting assembly and is disposed between the first lighting assembly and the outside of the vehicle; and the second projection lens is distinct from the same or another transparent cover that covers the second lighting assembly and is disposed between the second lighting assembly and the outside of the vehicle.

8. A vehicle comprising a sensor configured to determine a direction of turning of the vehicle and a lighting arrangement, the lighting arrangement comprising:

a first lighting assembly disposed to the left of a longitudinal axis of the vehicle and comprising a first array of independently operable light emitting diodes and a first projection lens arranged to form a front left light beam for the vehicle from light output from the first array of light emitting diodes, a second lighting assembly disposed to the right of the longitudinal axis of the vehicle and comprising a second array of independently operable light emitting diodes and a second projection lens arranged to form a front right light beam for the vehicle from the second array of light emitting diodes;

the first and second lighting assemblies arranged with a center of the first array of light emitting diodes offset laterally with respect to the optical axis of the first projection lens to the right toward the longitudinal axis of the vehicle and with a center of the second array of light emitting diodes offset laterally with respect to the optical axis of the second projection lens to the left toward the longitudinal axis of the vehicle; and a controller configured to control activation of the light emitting diodes in the first array of light emitting diodes and to control activation of the light emitting diodes in the second array of light emitting diodes based on the direction of turning determined by the sensor to adjust output directions of the front left light beam and the front right light beam toward the direction of turning.

9. The vehicle according to claim 8, wherein the optical axis of the first projection lens and the optical axis of the second projection lens are each oriented parallel to the longitudinal axis of the vehicle.

10. The vehicle according to claim 8, wherein the first array of light emitting diodes is arranged substantially perpendicularly to the optical axis of the first projection lens and the second array of light emitting diodes is arranged substantially perpendicularly to the optical axis of the second projection lens.

11. The vehicle according to claim 8, wherein the first array of light emitting diodes and the second array of light emitting diodes are each linear arrays of light emitting diodes.

12. The vehicle according to claim 11, wherein the first array of light emitting diodes and the second array of light emitting diodes each comprise no more than ten light emitting diodes.

13. The vehicle according to claim 8, wherein the first projection lens and the second projection lens each have a parabolic horizontal cross-section.

* * * * *